(12) United States Patent
McInally

(10) Patent No.: US 10,570,673 B2
(45) Date of Patent: Feb. 25, 2020

(54) DOWNHOLE TOOL COMPRISING A ROTATING PART WITH A TORQUE LIMITING COUPLING

(71) Applicant: Qinterra Technologies AS, Stavanger (NO)

(72) Inventor: Gerald McInally, Bryne (NO)

(73) Assignee: Qinterra Technologies AS, Stavanger (NO)

( * ) Notice: Subject to any disclaimer, the term of this patent is extended or adjusted under 35 U.S.C. 154(b) by 114 days.

(21) Appl. No.: 15/759,407

(22) PCT Filed: Sep. 29, 2016

(86) PCT No.: PCT/NO2016/050196
§ 371 (c)(1),
(2) Date: Mar. 12, 2018

(87) PCT Pub. No.: WO2017/058027
PCT Pub. Date: Apr. 6, 2017

(65) Prior Publication Data
US 2018/0209491 A1    Jul. 26, 2018

(30) Foreign Application Priority Data
Oct. 1, 2015  (NO) .................................. 20151290

(51) Int. Cl.
*E21B 17/02*    (2006.01)
*F16D 31/08*    (2006.01)
(Continued)

(52) U.S. Cl.
CPC .............. *E21B 17/02* (2013.01); *E21B 3/035* (2013.01); *E21B 4/02* (2013.01); *F16D 31/04* (2013.01); *F16D 31/08* (2013.01); *E21B 41/0085* (2013.01)

(58) Field of Classification Search
CPC .......... F16D 31/04; F16D 31/08; F16D 31/02; F16D 31/00; F16D 31/06; E21B 4/02; E21B 17/02; E21B 41/0085; E21B 3/035
See application file for complete search history.

(56) References Cited

U.S. PATENT DOCUMENTS 3,242,770 A * 3/1966 Doversberger ......... E02F 3/844
74/731.1
3,841,420 A  10/1974 Russell
(Continued)

FOREIGN PATENT DOCUMENTS

WO    2004074711 A1    9/2004

*Primary Examiner* — Nicole Coy
(74) *Attorney, Agent, or Firm* — Gable Gotwals

(57) ABSTRACT

The invention relates to a downhole tool for use in a petroleum well. The downhole tool (100) comprises a first part (110) comprising a driving unit (8), and second part (120) comprising a driven unit (9), wherein the drive unit (8) is configured for driving the driven unit (9). The downhole tool (100) comprises a coupling unit (1) having an input side (S1) coupled with the driving unit (8) and an output side (S2) coupled with the driven unit (9), wherein the driving unit (8) is configured for driving the driving unit (9) via the coupling unit (1) comprising a torque limiting coupling having a first operational mode, the coupling unit (1) transfers all torque from the input side (S1) to the output side (S2), the coupling unit (1) further having a second operational mode, wherein the coupling unit (1) slips such that less torque is transferred form the input side (S1) to the output side (S2), wherein the second operational mode is automatically activated when the torque load on the input side exceeds a predefined level, and wherein the first operational mode is automatically activated when the torque load on the input side reduces to a level below a further predefined level. The coupling unit (1) comprises a displacement pump (2), wherein the displacement pump (2) is activated by opening of a pressure-
(Continued)

limitation valve (4), for facilitating slipping of the coupling unit (1) when the coupling unit (1) is switching to the second operational mode, and wherein the displacement pump (2) is deactivated by closing of the pressure-limitation valve (4), for locking the coupling unit (1) when the coupling unit (1) is switching to the first operational mode.

13 Claims, 10 Drawing Sheets

(51) Int. Cl.
*E21B 3/035* (2006.01)
*F16D 31/04* (2006.01)
*E21B 4/02* (2006.01)
*E21B 41/00* (2006.01)

(56) References Cited

U.S. PATENT DOCUMENTS

| | | |
|---|---|---|
| 4,193,484 A | 3/1980 | Collier |
| 5,485,889 A | 1/1996 | Gray et al. |
| 6,129,160 A | 10/2000 | Williams et al. |
| 2008/0121432 A1 | 5/2008 | Russell et al. |
| 2012/0118646 A1 | 5/2012 | Russell et al. |
| 2013/0056223 A1 | 3/2013 | Nichols |

* cited by examiner

DOWNHOLE TOOL COMPRISING A ROTATING PART WITH A TORQUE LIMITING COUPLING

This U.S. application is the National Phase of PCT Application No. PCT/NO2016/050196 filed 29 Sep. 2016 which claims priority to Norwegian Patent Application No. 20151290 filed 1 Oct. 2015, each of which are incorporated by reference.

The invention relates to a downhole tool for use in a petroleum well, the downhole tool comprising a first part comprising a driving unit, and second part comprising a driven unit, wherein the driving unit is configured for driving the driven unit.

Downhole tools for well intervention operations conveyed by electric wireline often employ motors, particularly electric motors, which are directly driving a load, for instance a drill bit. Directly driven mechanisms, wherein the motor in the driving unit is directly coupled to the driven unit, have the advantage that the operational efficiency is high. Smaller motors that use less energy may then be used. This is very desirable since the total electrical power which can be transmitted on the electric wireline is limited. However, such solutions are vulnerable to overload, blocking and potential damage. Due to the nature of downhole applications in connection with petroleum production there is the issue of inaccessibility of the tool in case of problems since it can be many kilometres deep in an oil well, which puts a severe challenge on solving this problem. This normally means that in the case of such problems the downhole tool has to be pulled out of the oil well to the surface drilling rig in order to be repaired or reset, which leads to many hours of unproductive time.

US2013/0056223A1 discloses a downhole torque limiter and method, which eliminate damage to downhole components by eliminating excessive torque transmission. The device comprises a housing, compression assemblies, and anti-rotation plates. Inner and outer assemblies of the device are permitted to slip with respect to each other after reaching a settable torque limit, which is preferably below the maximum capacity of other downhole components. The device may be positioned in drill strings that comprise a downhole motor and/or drill bit as well as drill strings that do not comprise a downhole motor and/or drill bit. In drill strings comprising a downhole motor and/or drill bit, the device may be positioned below the downhole motor and above the drill bit, adjacent to and above the downhole motor, or above the downhole motor such that at least one drill string joint is positioned between the device and the downhole motor.

The invention has as its objective to remedy or to reduce at least one of the drawbacks of the prior art, or at least provide a useful alternative to prior art.

The objective is achieved through features, which are specified in the description below and in the claims that follow.

The invention is defined by the independent patent claims. The dependent claims define advantageous embodiments of the invention.

In a first aspect the invention provides a downhole tool (which is for example run on an electric wireline) for use in a petroleum well, the downhole tool comprising a first part comprising a driving unit, and second part comprising a driven unit, wherein the driving to unit is configured for driving the driven unit. The downhole tool further comprises a coupling unit having an input side coupled with the driving unit and an output side coupled with the driven unit, wherein the driving unit is configured for driving the driven unit via the coupling unit, wherein the coupling unit comprises a torque limiting coupling having a first operational mode wherein the coupling unit transfers all torque from the input side to the output side, the coupling unit further having a second operational mode, wherein the coupling unit slips such that less torque is transferred from the input side to the output side, wherein the second operational mode is automatically activated when the torque load on the input side exceeds a predefined level, and wherein the first operational mode is automatically activated when the torque load on the input side reduces to a level below a further predefined level. The coupling unit comprises a displacement pump, wherein the displacement pump is activated by opening of a pressure-limitation valve, for facilitating slipping of the coupling unit when the coupling unit is switching to the second operational mode, and wherein the displacement pump is deactivated by closing of the pressure-limitation valve for locking the coupling unit when the coupling unit is switching to the first operational mode.

The effects of the downhole tool in accordance with the invention are as follows.

The invention uses a coupling unit comprising a torque-limiting coupling in between the driving unit and the driven unit of a downhole tool. In the downhole tool of the invention this coupling effectively forms an overload coupling, but has additional functionality in that it automatically switches back and forth between its two operational modes, i.e. full-engagement mode (=first operational mode) and slipping mode (=second operational mode). When the torque load on the input side exceeds a predefined level the coupling unit switches to its second operational mode (i.e. starts slipping thereby transferring a reduced torque to the output side of the coupling unit), and when the torque load on the input side reduces to a level below a further predefined level (the further predefined level may be the substantially same as the predefined level, but it may be also be different from the latter due to a "hysteresis effect") the coupling unit switches to its first operational mode (i.e. fully engages transferring all torque to the outside side of the coupling unit). The inventors have realized that the use of a displacement pump constitutes a very convenient implementation of a torque-limiting coupling in a petroleum well, because of the presence of fluids downhole. Such fluids may be used for cooling purposes and/or they may be used by the displacement pump itself. Another advantage is that such a torque limiting coupling may be designed to be very compact, which is very advantageous in downhole tools.

In an embodiment of the downhole tool in accordance with the invention the torque-limiting coupling comprises a housing and the displacement pump provided within the housing, wherein said housing comprises:
  a rotor, wherein said rotor is attached to a first connection device that is axially rotatable around a rotation axis;
  an inlet connected to a fluid reservoir;
  a pressure chamber connected to an outlet; and
  a pressure limitation valve, wherein said housing is attached to a second connection device that is rotatable around a rotation axis; and wherein said pressure limitation valve is provided between said pressure chamber of said displacement pump and said outlet. This embodiment conveniently embodies an implementation of a torque-limited coupling based on a displacement pump.

In an embodiment of the downhole tool in accordance with the invention one of the driving unit and the driven unit is attached to the housing via one of the connection devices, and the second one of the driving unit and the driven unit is attached to the rotor via the second one of the connection devices. Such configuration forms a convenient connection of the respective parts in the downhole tool.

In an embodiment of the downhole tool in accordance with the invention the rotation axes for the connection devices are concentric.

In an embodiment of the downhole tool in accordance with the invention the outlet is connected to the fluid reservoir.

In an embodiment of the downhole tool in accordance with the invention the outlet of the pump and the inlet of the pump are in fluid communication with each other via the fluid reservoir.

In an embodiment of the downhole tool in accordance with the invention the torque-limiting coupling is provided within a fluid-filled enclosure.

In an embodiment of the downhole tool in accordance with the invention the fluid reservoir is formed by the surrounding fluid-filled enclosure.

In an embodiment of the downhole tool in accordance with the invention the fluid reservoir is integrated in the torque-limiting coupling.

In an embodiment of the downhole tool in accordance with the invention the fluid is formed by a liquid.

In an embodiment of the downhole tool in accordance with the invention the displacement pump is formed by a gear wheel pump.

In an embodiment of the downhole tool in accordance with the invention the pressure limitation valve is exchangeable. Exchangeability of the pressure limitation valve opens up the possibility to design the downhole tool for different applications. As will be further explained in the detailed description the pressure limitation valve determines the properties of the torque-limiting coupling. Changing the pressure-limitation valve therefore will change the behaviour of the downhole tool, i.e. the behaviour can be tailored to the desired specifications for the respective application.

In an embodiment of the downhole tool in accordance with the invention the coupling unit further comprises a resiliently-expandable chamber in fluid communication between the displacement pump and the pressure limitation valve for reducing pressure variations for reducing torque load spikes at the driving unit. The reason for this is that pressure variations are at least partially absorbed by the expanding or shrinking of the resiliently-expandable chamber. This will smoothen the torque load spikes on the input side of the torque-limiting coupling.

In an embodiment of the downhole tool in accordance with the invention the resiliently-expandable chamber comprises a cylinder and a piston movable within the cylinder, wherein the piston is spring loaded inside the cylinder. This embodiment forms a convenient implementation of a resiliently-expandable chamber.

In the following examples of preferred embodiments will be described illustrated in the accompanying drawings, wherein.

Figure 1:
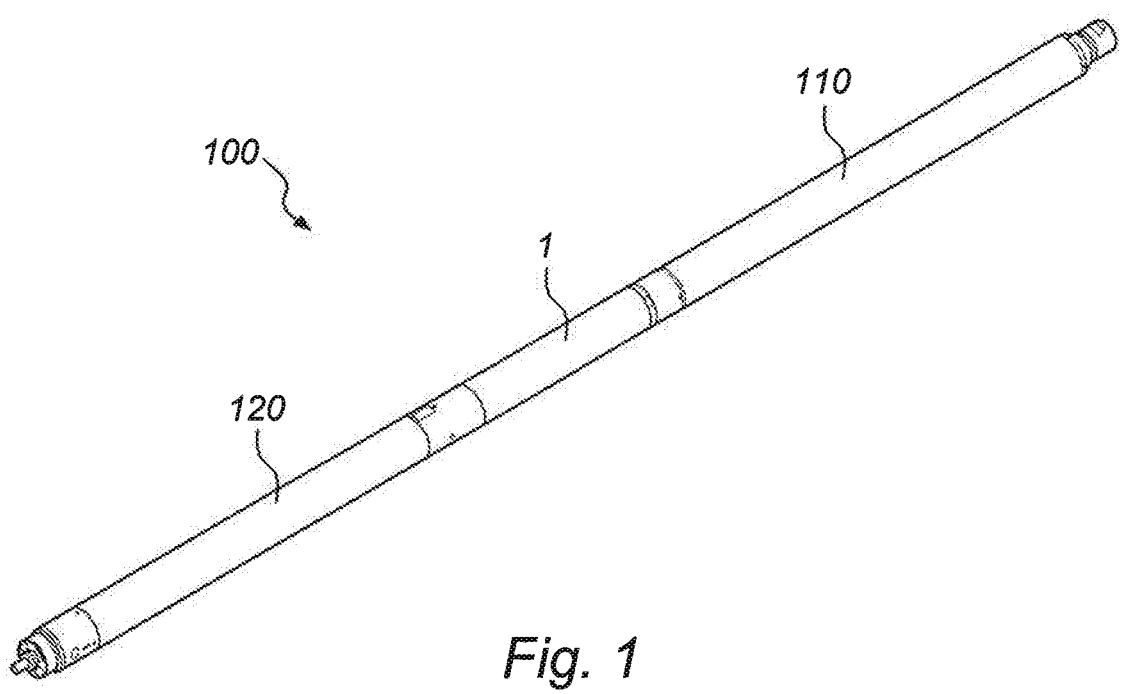
FIG. 1 shows a downhole tool in accordance with the invention.

The downhole tool of the invention is provided with a torque-limiting coupling, which automatically switches between its operational modes.

In many contemporary machines where the load is not constant and where a limiting mechanism for the maximum load must be used to protect the drive motor, hydraulic circuits are employed where the drive motor (electric or internal combustion) drives a hydraulic pump, which in turn drives a hydraulic motor. A relief valve in the hydraulic circuit limits the maximum torque output of the hydraulic motor, allowing it to come to a stop holding maximum load whilst the input drive motor can continue to operate freely within its safe operating range without danger of stall or overload. Such hydraulic circuits are very flexible but suffer from efficiency losses of 50% of more.

As already mentioned, directly driven mechanisms where the drive motor is connected directly to the load have the benefit of being much more efficient, meaning that smaller drive motors can be used, consuming less energy, however they are vulnerable to overload, stalling and potential damage if the driven load suddenly increases or is mechanically impeded. To prevent this overload condition, a number of torque limiting couplings have been developed to protect the drive train. These couplings typically employ spring-loaded friction clutches, which break away at pre-set torques, or spring-loaded balls or levers which connect one side of the drive shaft to the load until the pre-set torque is reached, when they are forced out of their detents allowing the drive motor to keep rotating. Such mechanisms are usually bulky and they are not suited to being activated very often without sustaining mechanical damage. In addition, they are not suited to oil filled drive systems where the motor and load are submerged in oil, a situation that is quite common.

Some known solutions are constructed for reset after they are released, achieved by an operator physically having to couple the coupling such that it is in engagement again. A tool coupled to the driven unit is then unproductive since the coupling will be released until the operator has reset the coupling again. In many usage situations the coupling is placed such that manual reset is extremely difficult and time-consuming to carry out for an operator or sometimes even impossible.

In this invention there is provided a torque-limiting coupling configured to limit transferred power between a driving unit and a driven unit. The torque-limiting coupling comprises a housing that holds at least a pump, and at least a pressure limitation valve. A suitable pump in accordance with the invention sucks in a fluid at its inlet side. A suitable pump is further configured for being able to keep and maintain a pressure built-up at the outlet side, also when the pump stops completely. A displacement pump is such a suitable pump. Another name for this group of pumps can be a positive displacement pump.

The drive gear in a pump is different depending on which type of pump one chooses. The suitable displacement pumps can be divided into the groups rotating and variable displacement pumps. Common for rotating displacement pumps is that the drive gear is formed by an axle that is attached in a fixed manner to a rotor. When the axle is rotated, the rotor rotates also. Then the rotor together with the surrounding housing and eventual parts that belong together with the housing will move the fluid inside the pump. Examples of pumps in this group are gear wheel pump, gerotor, lobe pump, screw pump, and peristaltic pump. In a variable displacement pump there is a piston that is driven up and down in a cylinder that together with check valves takes care of the pumping. In variable displacement pumps there is generally a crank axle that transfers the power from a rotating axle to oscillating pistons. Hereinafter, the drive gear of the pump refers a rotor.

In connection with the first end portion of the pump housing a first connection device can be connected to the rotor. The first connection device is configured for a stiff coupling between the rotor and either the driving unit or the driven unit. The housing is connected, with a concentric rotation axle like the first connection device, to another connection device for a stiff coupling between the housing and either the driven unit or the driving unit. A torque-limiting coupling coupled together with a driving unit and a driven unit is axially rotatable around a rotation axis that coincides with the rotation axis of said connection devices. At the pressure side of the pump the pump is provided with a pressure chamber.

The pump is provided with an inlet and an outlet. The inlet is in fluid communication with the fluid reservoir. The outlet and the inlet can be in fluid communication with each other also via the fluid reservoir. In an embodiment the fluid reservoir can be integrated in the housing. In a further alternative embodiment the torque-limiting coupling can be immersed in a fluid. The surrounding fluid can form the fluid reservoir.

Between the pressure chamber and the outlet there is provided a pressure limitation valve that in a closed position is configured to block the fluid stream between the pressure chamber and the outlet. The pressure limitation valve takes an open position when the pressure in the fluid between the pump and the pressure limitation valve exceeds a preset level. Then the valve opens for fluid stream through the valve and then also for the fluid transport between the pressure chamber and the fluid reservoir.

With these embodiments the driving unit will drive the pump, and the pump will increase the pressure in the pressure chamber. When the pressure to which the pressure limitation valve is exposed to, is lower than the preset pressure limit, the fluid stream from the pressure chamber to the outlet will be blocked by the closed pressure limitation valve. When the pump is blocked by the still-standing fluid, and the driven unit coupled to the torque-limiting coupling is exposed to loads within desired limits, then the housing and the pump gear wheel essentially rotate together like a mechanical coupling. If the driven unit coupled to the torque-limiting coupling is exposed to load, the torque to which the coupling is exposed will increase according to how large the load is. A higher torque leads to a higher pressure in the fluid that resides in the pressure chamber. When the pressure exceeds the preset limit, the pressure limitation valve opens and the fluid transport between the pressure chamber and the outlet arises. This allows the rotation speed on the driving unit to be essentially unchanged. The rotation speed of the driven unit is then limited according to how large fluid stream will slip beyond the pressure limitation valve and the torque transmitted between the driving unit and the driven unit will be determined by the pressure limit, avoiding damage to either unit. The pump in the coupling will continuously refill with fluid from the surrounding fluid reservoir.

Different types of pressure limitation valve can be chosen, according to the desired function of the torque-limiting coupling. One common function is that the pressure limitation valve remains closed when the pressure on the pressure side is equal to or lower than a preselected pressure. Fluid will then not be able to pass beyond the pressure limitation valve. A further common function is that when the pressure on the pressure side exceeds a preselected limit, the pressure limitation valve opens, such that fluid can pass beyond the pressure limitation valve.

One type of pressure limitation valve maintains then the pressure chamber at the preselected limit, and lets slip through fluid from the pressure chamber to the fluid reservoir such that the pressure in the pressure chamber is held at the desired level. If the pressure drops below the limit the valve will automatically close. With this solution power that is transferred from the driving unit to the driven unit will regulate itself according to how large the resistance the driven unit is exposed to. The power transferred from the driving unit to the driven unit will decrease when the driven unit is exposed to further influences that give high torque loads, and if the load is large enough the driven unit will stop completely. If the torque load is reduced such that the pressure in the pressure chamber becomes lower than the preselected limit, the pressure limitation valve closes, and the coupling acts as a mechanical coupling again.

Another type of pressure limitation valve will, when it is activated, open up for full throughput of the fluid between the pressure chamber and the fluid reservoir. The pressure in the pressure chamber is then limited to a minimum and the transfer of power from the driving unit to the driven unit stops. The driven unit will then stop completely.

Hereinafter specific embodiments will be further described with reference to the figures.

FIG. 1 shows a downhole tool 100 in accordance with the invention. This downhole tool comprises a first part 110 comprising a driving unit (for instance an electric motor) and a second part 120 comprising a driven unit. In this example the second part 120 comprises a gearbox, which may be connected with further tool parts such as drill bit, a honing or milling brush tool, a debris collector tool (all not shown). The downhole tool 100 further comprises a torque-limiting coupling 1 in between the first part 110 and the second part 120. The torque-limiting coupling 1 will be discussed in more detail with reference to FIGS. 3 to 12.

Figure 2:
FIG. 2 shows a graph indicating the electrical motor current that is drawn by the driving unit, wherein the torque-limiting coupling switches between its different modes.

FIG. 2 shows a graph indicating the electrical motor current that is drawn by the driving unit, wherein the torque-limiting coupling switches between its different modes. It can be observed from the figure that there are two states for the torque-limiting coupling unit: When the motor torque (current) is under the pre-set (or predefined) level, the torque-limiting coupling acts as a solid drive shaft and the DC-motor directly drives thru the gearbox to the load; When the motor torque (current) exceeds the pre-set level, the torque-limiting coupling slips allowing the DC-motor to keep rotation even when the load is stationary. The maximum torque setting is still applied to the load when the torque-limiting coupling is slipping and if the load decreases (by reducing the weight on the bit (WOB) for example) the torque-limiting coupling will start rotating again as before.

FIG. 2 shows that there is a very clear indication on the current curve when the torques limiting coupling activates. The downhole tool configuration here was a series connection of an electric motor unit, a torque-limiting coupling, a gearbox, and a drill bit. At the pre-set current level on time instants tca the torque-limiting coupling will start to slip and current will drop and 'flatline' at a stable value. When the bit is freed by picking up at time instants tcl, the torque-limiting coupling 1 will stop slipping and the bit will resume milling again. When the torque-limiting coupling 1 is slipping, the torque-limiting coupling pump will be pumping. This may generate a temperature increase. Another effect which is visible from FIG. 2 is that the torque-limiting coupling 1 has a smoothening effect on the current curve (and thereby the torque spikes), although it shows some activity (noise due to the milling). This means that the maximum useable current can be higher as there is not so much noise on the line.

Figure 3:
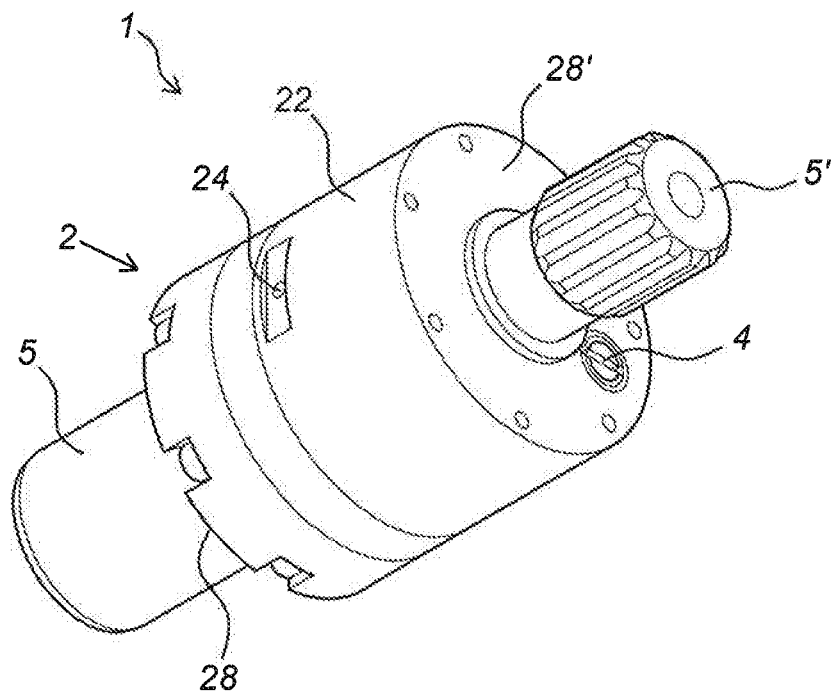
FIG. 3 shows in perspective a torque-limiting coupling in accordance with the invention.
Figure 4:
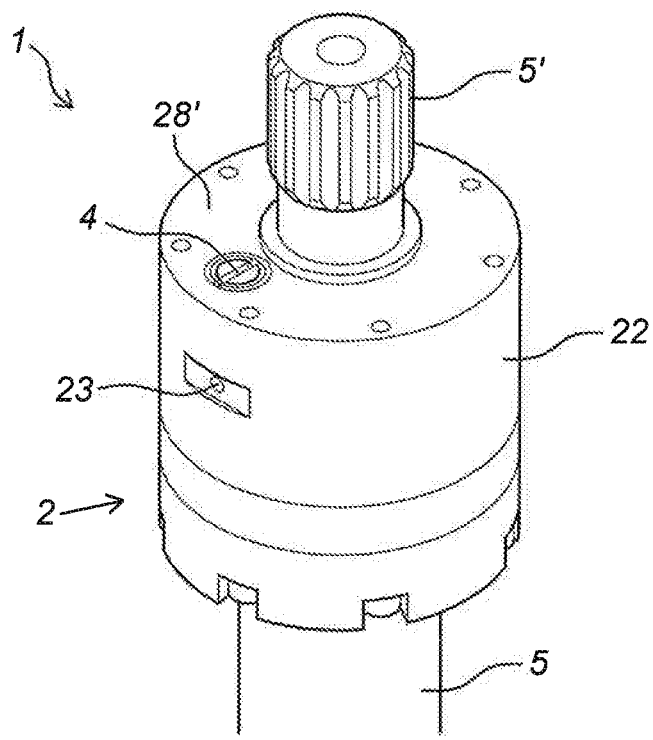
FIG. 4 shows in perspective a torque-limiting coupling from a different angle.
Figure 5:
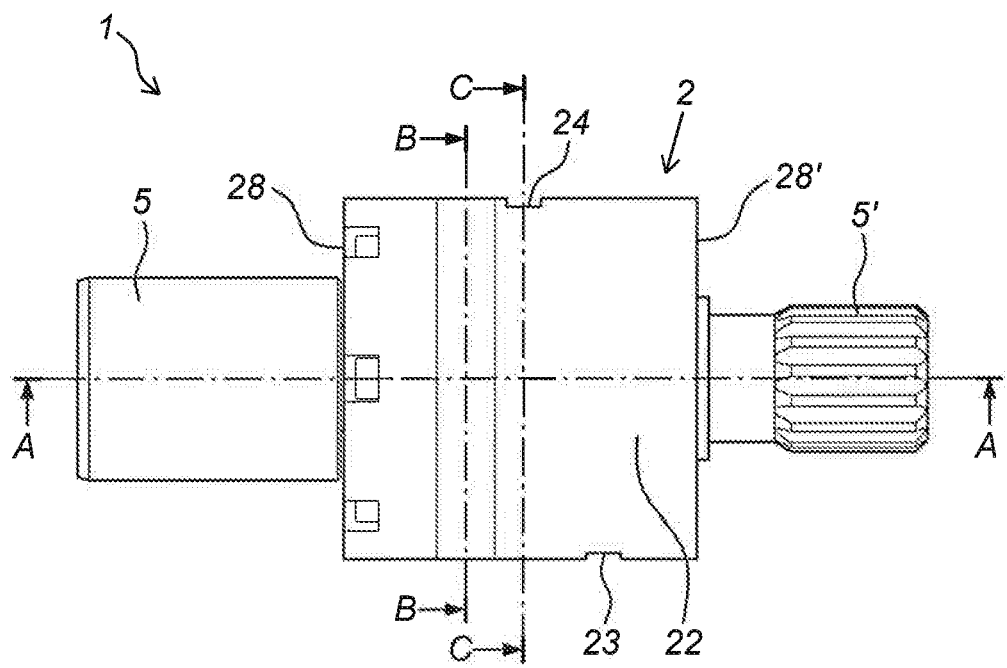
FIG. 5 shows a side view of the torque-limiting coupling.
Figure 6:
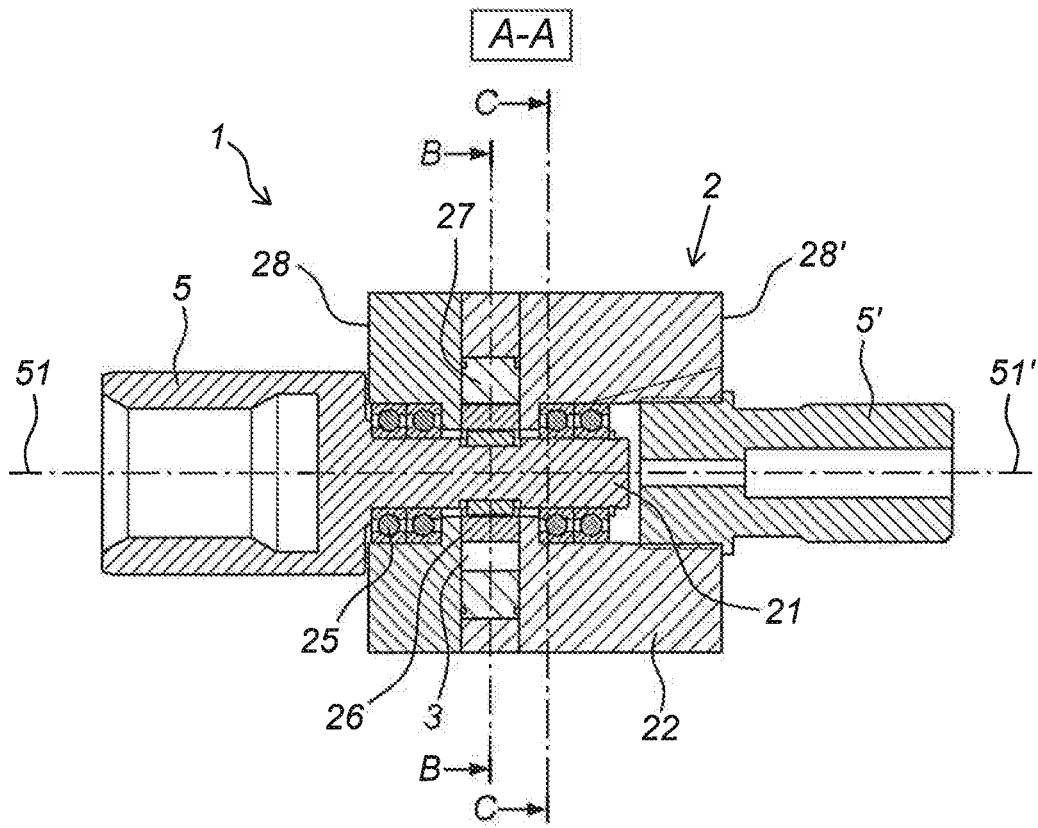
FIG. 6 shows an axial cut view A-A through the torque-limiting coupling.
Figure 7:
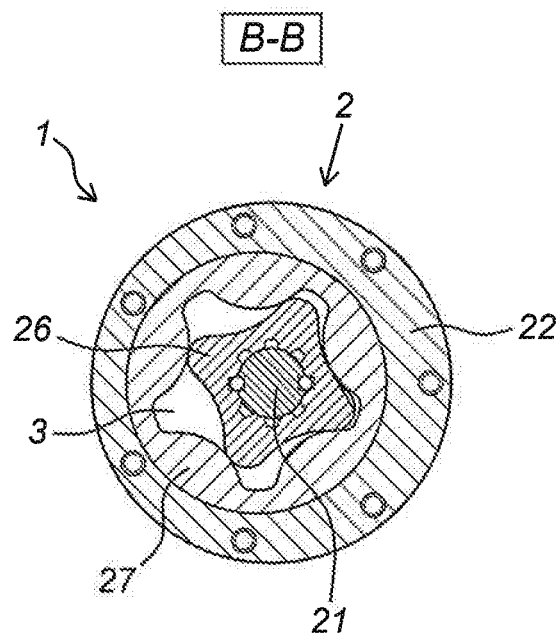
FIG. 7 shows a radial cut view B-B through the torque-limiting coupling.
Figure 8:
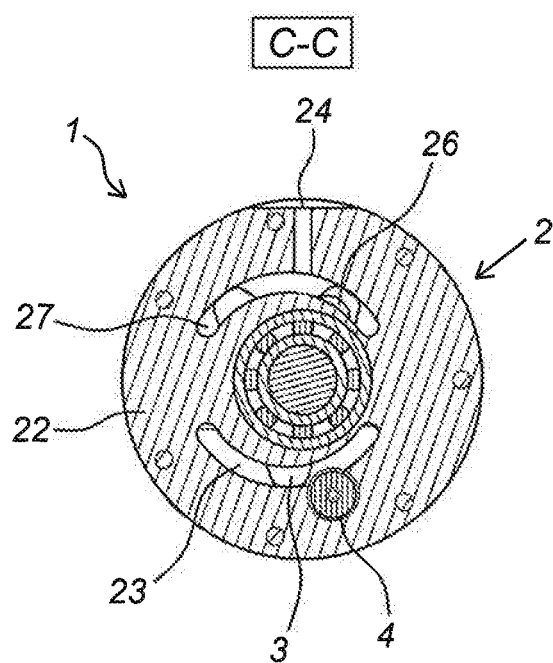
FIG. 8 shows a radial cut view C-C through the torque-limiting coupling.
Figure 9:
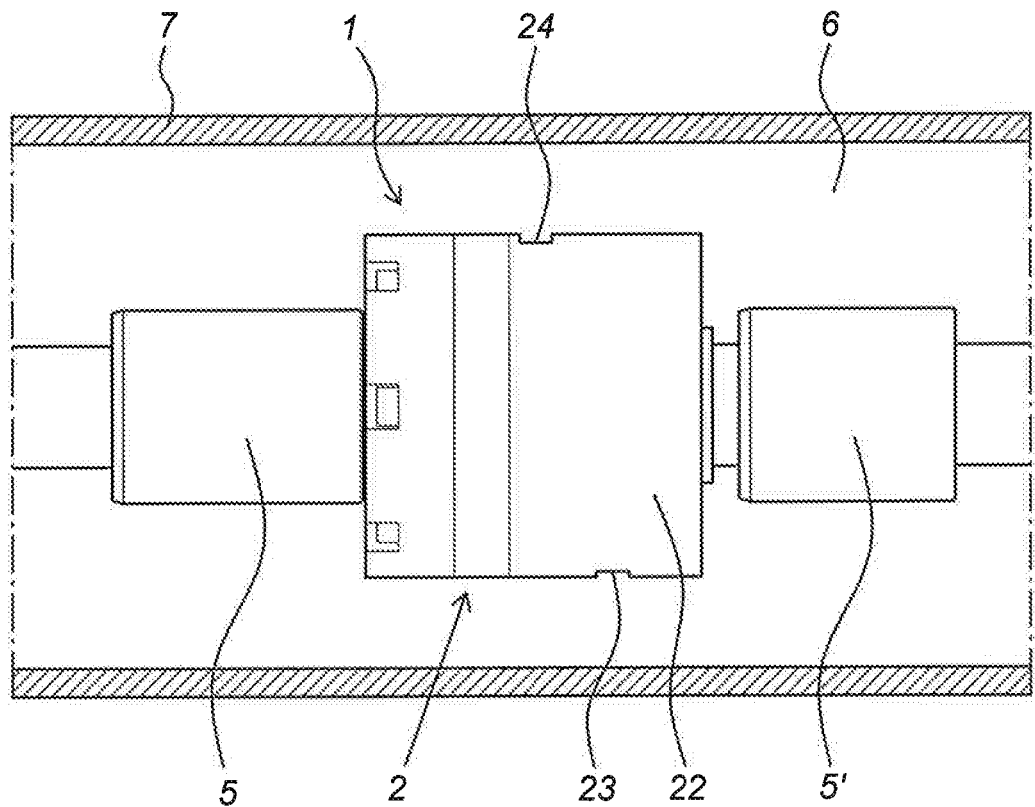
FIG. 9 shows a side view of the torque-limiting coupling shown in an axial cut view of a fluid-filled enclosure.
Figure 10:
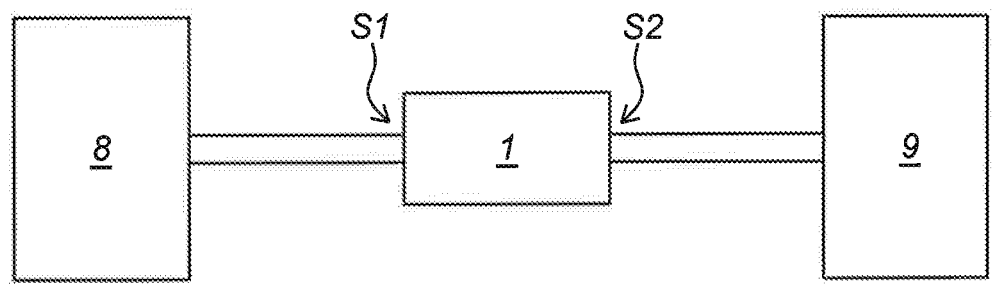
FIG. 10 shows a principle sketch of the torque-limiting coupling when mounted in a drive line between a driving unit and a driven unit.

Hereinafter the torque-limiting coupling 1 of the invention is more specifically described with reference to FIGS. 3 to 12. FIG. 3 shows in perspective the torque-limiting coupling in accordance with the invention. FIG. 4 shows in perspective a torque-limiting coupling from a different angle. FIG. 5 shows a side view of the overload coupling. FIG. 6 shows an axial cut view A-A through the torque-limiting coupling. FIG. 7 shows a radial cut view B-B through the torque-limiting coupling. FIG. 8 shows a radial cut view C-C through the torque-limiting coupling. FIG. 9 shows a side view of the torque-limiting coupling shown in an axial cut view of a fluid-filled enclosure. FIG. 10 shows a principle sketch of the torque-limiting coupling when mounted in a drive line between a driving unit and a driven unit.

Figure 11:
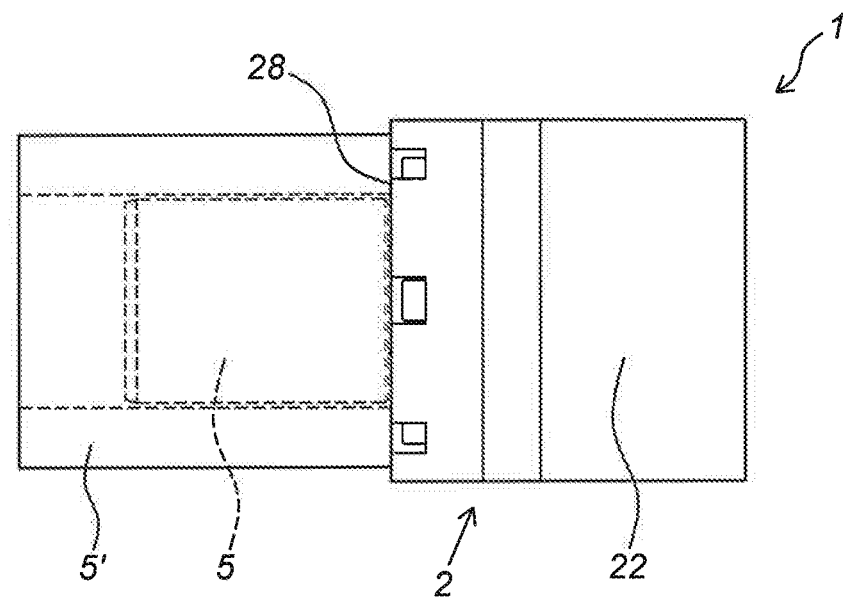
FIG. 11 shows a side view of an alternative embodiment, wherein the connection device attached to the housing enclosures the connection device that is attached to the rotor.
Figure 12:
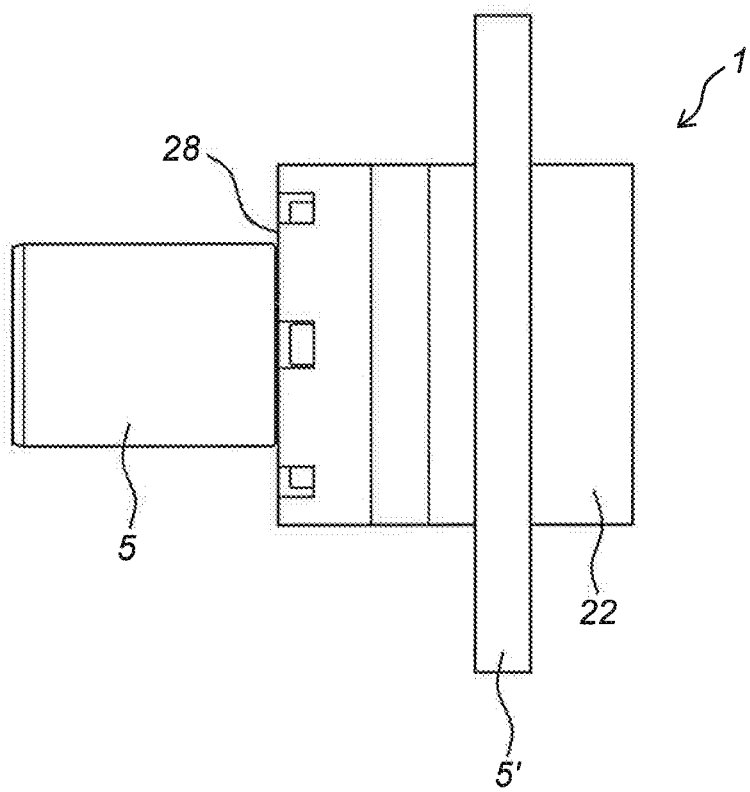
FIG. 12 shows a side view of an alternative embodiment, wherein the connection device attached to the housing is a gear wheel ring that encloses the housing.

FIG. 11 shows a side view of an alternative embodiment, wherein the connection device attached to the housing enclosures the connection device that is attached to the rotor. FIG. 12 shows a side view of an alternative embodiment, wherein the connection device attached to the housing is a gear wheel ring that encloses the housing.

In FIGS. 3 to 12 reference number 1 indicates a torque-limiting coupling in accordance with the invention. In the shown example the torque-limiting coupling 1 is shown when placed in use position immersed in a fluid in a fluid-filled enclosure 7. The fluid-filled enclosure 7 comprises a fluid reservoir 6 for the torque-limiting coupling 1, see FIG. 9. The fluid is typically a liquid, for example oil.

The torque-limiting coupling 1 comprises a pump 2. The pump 2 is shown as a gear wheel pump. In the example the gear wheel pump is shown more specifically as a gerotor of a widely known type. A skilled person will know that also other types of displacement pumps can be utilized in accordance with the invention. The pump 2 comprises a housing 22. The housing 22 is shown with a cylindrical shape with a first end portion 28 and a second end portion 28'. The pump 2 comprises an inner rotatable gear wheel 26 and a outer rotatable gear wheel 27, wherein the gear wheels 26, 27 in a portion are in engagement with each other. The inner gear wheel 26 is coupled in a stiff manner to a first connection device 5 that extends from the end portion 28 of the housing 22. The first connection device 5 is to mounted in many bearings 25 in the housing 22. The connection device 5 can rotate axially relative to the housing 22. The housing 22 is in its other end portion 28' attached to a second connection device 5'. It will be understood that other placements of the second connection device 5' also work. As shown in FIG. 11 the second connection device 5' is attached to the first end portion 28, enclosing the first connection device 5, or as shown in FIG. 12, a second connection device 5' shown as a gear wheel ring enclosing and being attached to the housing 22. In the alternative embodiment the torque-limiting coupling 1 will have to be supplemented with supports (not shown) in order to be able to rotate around a rotation axis 51.

When the first connection device 5 rotates axially with a first rotation speed, and the housing 22 does not rotate or rotates with a different rotation speed, the gear wheels 26, 27, will rotate axially within the housing 22. The rotating gear wheels 26, 27 create a suction side and a pressure side in the pump 2. The pump 2 is at its pressure side provided with a pressure chamber 3, see especially FIGS. 6, 7, and 8.

The pump 2 is provided with an inlet 24 configured for transporting fluid from the fluid reservoir 6 and to the suction side of the pump 2. The pump 2 is further provided with an outlet 23 configured for transporting fluid from the pressure chamber 3 and to the fluid reservoir 6. Between the pressure camber 3 and the outlet 23 the torque-limiting coupling 1 is provided with a pressure limitation valve 4, configured for regulating the fluid transport from the pressure chamber 3 and to the fluid reservoir 6. At a fluid pressure that is identical to or lower than the preselected limit, the pressure limitation valve 4 blocks all fluid transport through the outlet 3.

When the pump 2 is driven by the driving unit 8 via the torque-limiting coupling 1, see FIG. 10, fluid is sucked in from the fluid reservoir 6 and to the suction side of the pump 2 via the inlet 24 and further through the pump 2. The pressure chamber 3 of the pump is localised in the fluid-communicating surroundings of the decreasing spaces between the gear wheels 26, 27, and the fluid is being pressed out by the pump 2 and against the pressure limitation valve 4. When the fluid pressure in the pressure chamber is lower than a preselected opening pressure for the pressure limitation valve 4, the pressure limitation valve 4 will prevent transport of fluid from the pump 2 and to the fluid reservoir 6 via the outlet 23.

This has as effect that the rotating force applied to the pump 2 from the driving unit 8 via the first connection device 5 is transferred from a first side S1 of the coupling unit 1 to a second side S2 (FIG. 10) of the coupling unit 1, in that the rotating force is transferred to the housing 22 via the still-standing fluid such that the housing 22 also begins to rotate in the same direction as the pump 2, and the rotation is continued to the driven unit 9 via the connection device 5'. When the pressure on the pressure limitation valve 4 will exceed the preselected opening pressure, the pressure limitation valve 4 opens and the fluid stream between the pump 2 and the fluid reservoir 6 starts, and the pump 2 will be refilled from the fluid reservoir 6 via the inlet 24 at the suction side of the pump 2. The rotation speed of the rotor 21 remains in principle the same, but the rotation speed of the housing 22 decreases. The power transferred to the driven unit 9 is then limited.

What happens further depends on the properties of the chosen pressure limitation valve 4.

One type of pressure limitation valve 4 can regulate the fluid stream such that the pressure in the pressure chamber 3, after that the pressure limitation valve 4 has opened, is held at a preselected pressure. The pressure limitation valve 4 bleeds an amount of fluid that ensures that the desired pressure in the pressure chamber 3 is maintained and simultaneously that the pressure does not become higher. When the pressure in the pressure limitation valve 4 is exposed to drop below the preselected limit, the pressure limitation valve 4 will block. The rotation speed of the rotor 21 remains essentially the same, but the rotation speed of the housing 22 increases, such that the rotor 21 and the housing 22 rotate with essentially the same rotation speed. The result of the use of a torque-limiting coupling 1 provided with such type of pressure limitation valve 4 is that the maximum torque, defined by the preset openings pressure of the pressure limitation valve 4, will be held between the driving unit 8 and the driven unit 9. The driving unit 8 will rotate with that so torque, and the driven unit 9 will rotate with the same or a lower rotation speed, depending on which effect the used torque has on the driven unit 9.

Another type of pressure limitation valve 4 can, when the pressure exceeds a desired limit, open up and let through the fluid without limitation. Transfer of the power from the driving unit 8 and to the driven unit 9 will then stop, and the driven unit 9 will stop. One such type of pressure limitation valve 4 may require that the driving unit 8 is stopped before the pressure limitation valve 4 can be reset. Reset may happen by itself when the fluid stream between through the pressure limitation valve 4 stops.

The pressure limitation valve 4 can be exchangeable and therewith give a simple application of the torque-limiting coupling 1 for a desired application area.

A suitable application area for the torque-limiting coupling 1 can be in a downhole tool for use in connection with oil exploration and production.

In a further embodiment (not shown) the torque-limiting coupling 1 is provided with a fluid reservoir 6 that is integrated into the housing 22 and closes the fluid communication path between the outlet 23 of the pump and the inlet 24 of the pump via the fluid reservoir 6.

The torque-limiting coupling 1 can then be used without it being placed in a fluid-filled enclosure 7.

Figure 13:
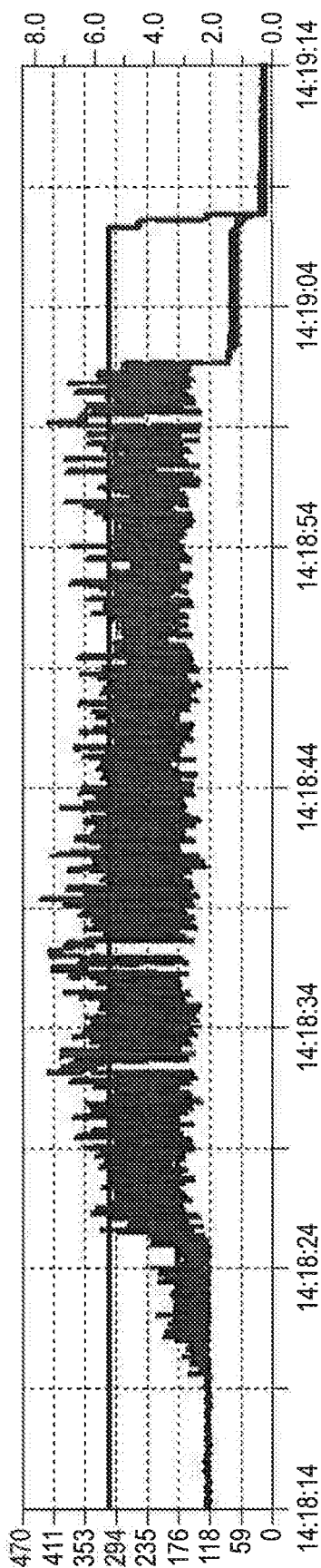
FIG. 13 shows a current and voltage curve for a run with a downhole tool with a directly-driven milling tool without a torque-limiting coupling illustrating a sudden stall.

FIG. 13 shows a current and voltage curve for a run with a downhole tool with a directly-driven milling tool without a torque-limiting coupling 1. The figure clearly shows that there is a lot of noise and eventually the operations evens stalls leading to a complete shutdown.

Figure 14:
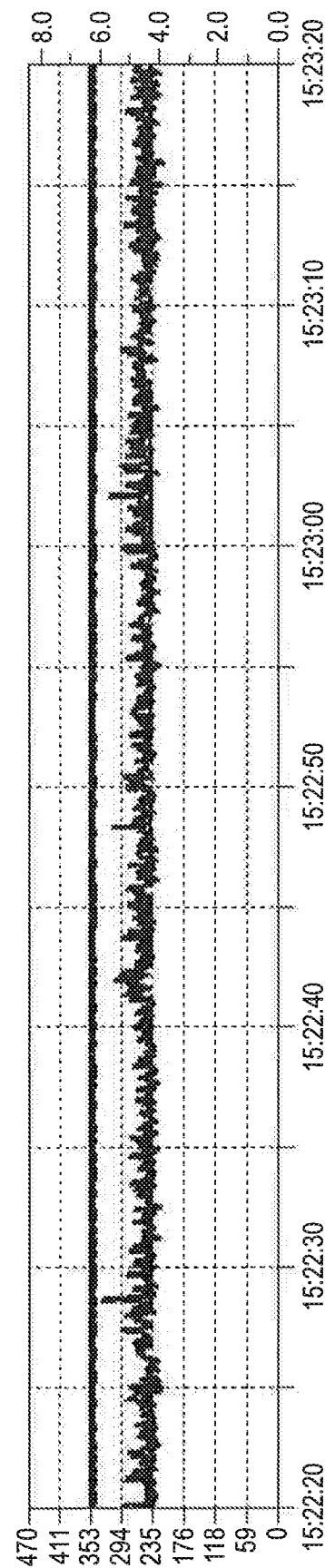
FIG. 14 shows a current and voltage curve for a run with such milling tool in accordance with the invention with the torque-limiting coupling.

FIG. 14 shows a current and voltage curve for a run with such milling tool in accordance with the invention with the torque-limiting coupling 1. When this figure is compared with the previous one it can be easily seen that there is much less noise on the current curve during the milling.

Figure 15:
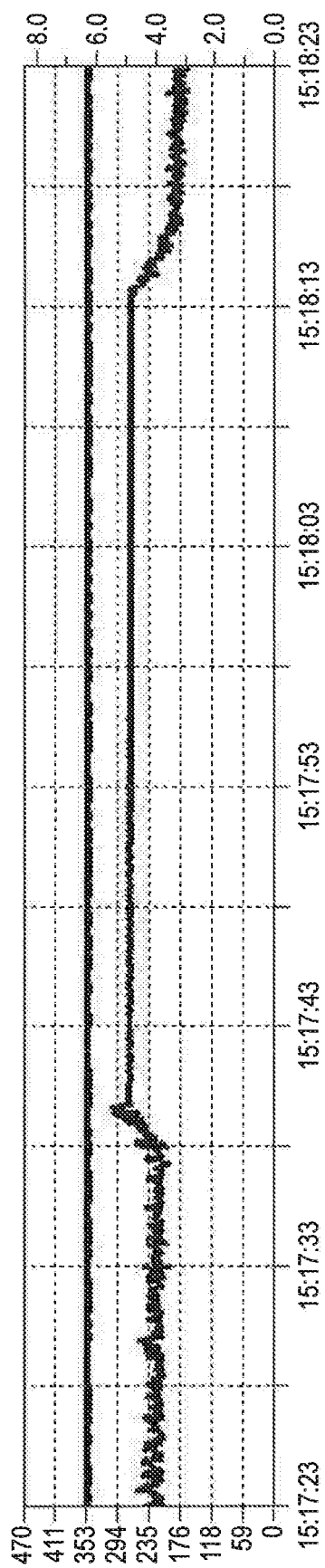
FIG. 15 shows a current and voltage curve for a run with the milling tool in accordance with the invention, wherein the milling tool gets stuck, stalls, picks up and starts milling again.
Figure 16:
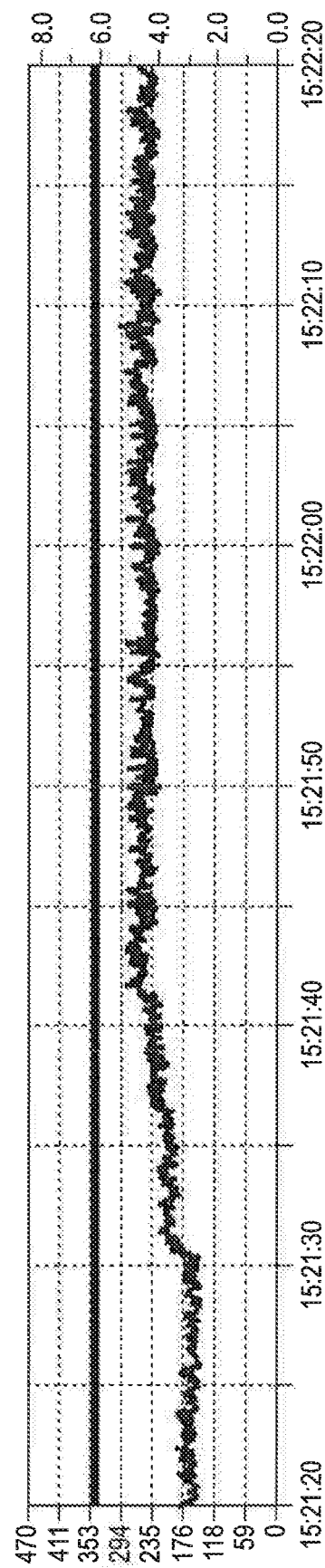
FIG. 16 shows the current and voltage curve for a run with the milling tool in accordance with the invention, wherein the pressure on the milling tool is gradually increased.
Figure 17:
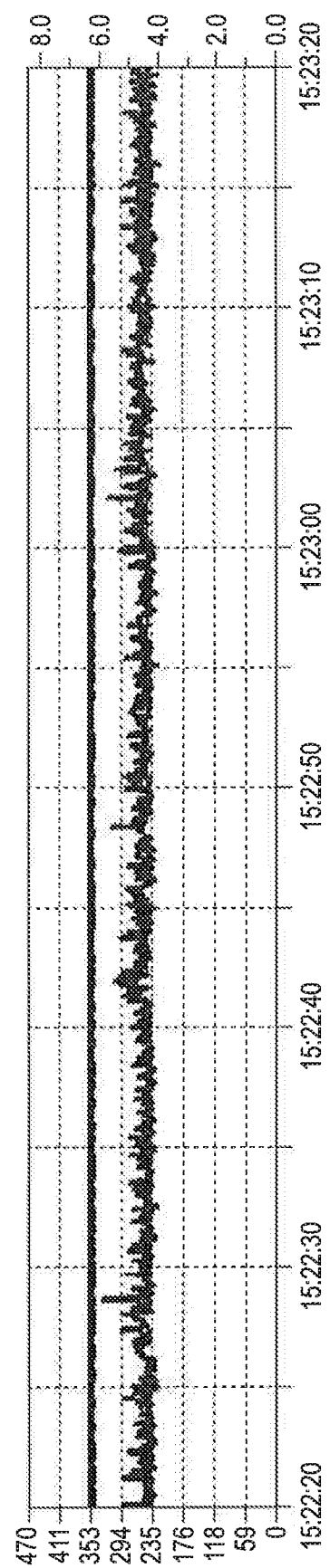
FIG. 17 shows the current and voltage curve for the same run as FIG. 16 after continuing of the milling.

When compared with a downhole tool without a torque-limiting coupling 1 the downhole tool 100 in accordance with the invention allows for much longer operations than downhole tools without the torque-limiting coupling. The following figures illustrate this. FIG. 15 shows a current and voltage curve for a run with the milling tool in accordance with the invention, wherein the milling tool gets stuck, stalls, picks up and starts milling again. FIG. 16 shows the current and voltage curve for a run with the milling tool in accordance with the invention, wherein the pressure on the milling tool is gradually increased. FIG. 17 shows the current and voltage curve for the same run as FIG. 16 after continuing of the milling.

Figure 18:
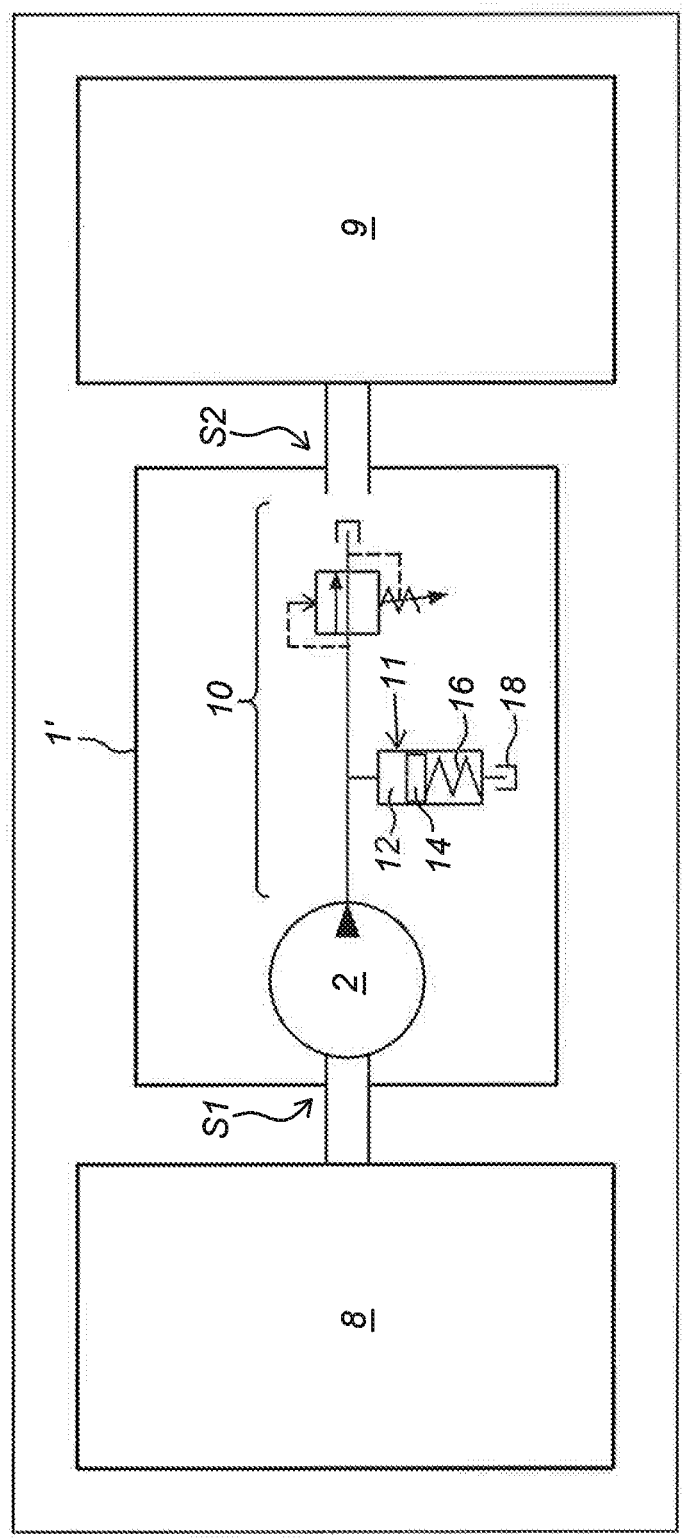
FIG. 18 shows a further embodiment of the torque-limiting coupling used in the invention.

FIG. 18 shows a further embodiment of the torque-limiting coupling 1' used in the invention. The figure has been drawn in a schematic manner. It shows the driving unit 8, which drives the driven unit 9 via an improved torque-limiting coupling 1'. The improved torque-limiting coupling 1' also comprises a displacement pump 2 with the hydraulic circuit 10 (fluid reservoir 6, pressure chamber 3, pressure limitation valve 4, inlet 24, outlet 23, etc.) as discussed with reference to FIGS. 3 to 12. The main difference in the embodiment of FIG. 18, however, is that the hydraulic circuit 10 has been provided a resiliently-expandable chamber 11, which is in fluid communication with the fluid reservoir 6. The advantage of this embodiment is that the resiliently-expandable chamber 11 will at least partially absorb (dampen) pressure variations in the fluid in the fluid reservoir 6, such that torque variations on the output side S2 are not fully transferred to the input side S1, i.e. such that torque spikes at the driving unit 8 are reduced.

There are many ways of implementing a resiliently-expandable chamber 11. The example in FIG. 18 comprises a cylinder 12, which comprises a piston 14, which on its turn is resiliently mounted via a spring 16 to spring support. The resiliently-expandable chamber 11 is defined by the (variable) volume between the piston 14 and cylinder 12. It must be stressed that the invention is not limited to any specific implementation of the resiliently-expandable chamber 11. Another implementation could be an inflatable diaphragm for example.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. Downhole tool (100) for use in a petroleum well, the downhole tool (100) comprising a first part (110) comprising a driving unit (8), and second part (120) comprising a driven unit (9), wherein the driving unit (8) is configured for driving the driven unit (9), characterised in that the downhole tool (100) further comprises a coupling unit (1) having an input side (S1) coupled with the driving unit (8) and an output side (S2) coupled with the driven unit (9), wherein the driving unit (8) is configured for driving the driven unit (9) via the coupling unit (1), wherein the coupling unit (1) comprises a torque limiting coupling having a first operational mode wherein the coupling unit (1) transfers all torque from the input side (S1) to the output side (S2), the coupling unit (1) further having a second operational mode, wherein the coupling unit (1) slips such that less torque is transferred from the input side (S1) to the output side (S2), wherein the second operational mode is automatically activated when the torque load on the input side exceeds a predefined level, wherein the first operational mode is automatically activated when a torque load on the input side reduces to a level below a further predefined level, wherein the coupling unit (1) comprises a displacement pump (2), wherein the displacement pump 2 is activated by opening of a pressure-limitation valve (4) for facilitating slipping of the coupling unit (1) when the coupling unit (1) is switched to the second operational mode, and wherein the displacement pump (2) is deactivated by closing of the pressure-limitation valve (4), for locking the coupling unit (1) when the coupling unit (1) is switched to the first operational mode; and wherein the torque-limiting coupling comprises a housing (22) and the displacement pump (2) provided within the housing (22), wherein said housing (22) comprises:

- a rotor (21), wherein said rotor (21) is attached to a first connection device (5) that is axially rotatable around a rotation axis (51);
- an inlet (24) connected to a fluid reservoir (6);
- a pressure chamber (3) connected to an outlet (23); and
- a pressure limitation valve (4), wherein said housing (22) is attached to a second connection device (5') that is rotatable around a rotation axis (51'); and
- wherein said pressure limitation valve (4) is provided between said pressure chamber (3) of said displacement pump (2) and said outlet (23).

2. The downhole tool (100) according to claim 1, wherein one of the driving unit (8) and the driven unit (9) is attached to the housing (22) via one of the connection devices (5, 5'), and the second one of the driving unit (8) and the driven unit (9) is attached to the rotor (21) via the second one of the connection devices (5, 5').

3. The downhole tool (100) according to claim 1, wherein the rotation axes (51, 51') for the connection devices (5, 5') are concentric.

4. The downhole tool (100) according to claim 1, wherein the outlet (23) is connected to a fluid reservoir (6).

5. The downhole tool (100) according to claim 4, wherein the outlet (23) of the pump (2) and the inlet of the pump (2) are in fluid communication with each other via the fluid reservoir (6).

6. The downhole tool (100) according to claim 5, wherein the torque-limiting coupling (1) is provided within a fluid-filled enclosure (7).

7. The downhole tool (100) according to claim 6, wherein the fluid reservoir (6) is formed by the surrounding fluid-filled enclosure (7).

8. The downhole tool (100) according to claim 1, wherein the fluid reservoir (6) is integrated in the torque-limiting coupling (1).

9. The downhole tool (100) according to claim 1, wherein the fluid is formed by a liquid.

10. The downhole tool (100) according to claim 1, wherein the displacement pump (2) is formed by a gear wheel pump.

11. The downhole tool (100) according to claim 1, wherein the pressure limitation valve (4) is exchangeable.

12. The downhole tool (100) according to claim 1, wherein the coupling unit further comprises a resiliently-expandable chamber (11) in fluid communication between the displacement pump (2) and the pressure-limitation valve (4) for reducing pressure variations for reducing torque load spikes at the driving unit (8).

13. The downhole tool (100) according to claim 12, wherein the resiliently-expandable chamber (11) comprises a cylinder (12) and a piston (14) movable within the cylinder (12), wherein the piston is resiliently mounted inside the cylinder (12).

* * * * *